350-96.2 SR
PWE31 XR 3,304,433
Feb. 14, 1967 O. F. HAMANN 3,304,433
PHOTOSENSITIVE LOGIC CIRCUITRY UTILIZING LIGHT PIPE
Filed Aug. 26, 1964
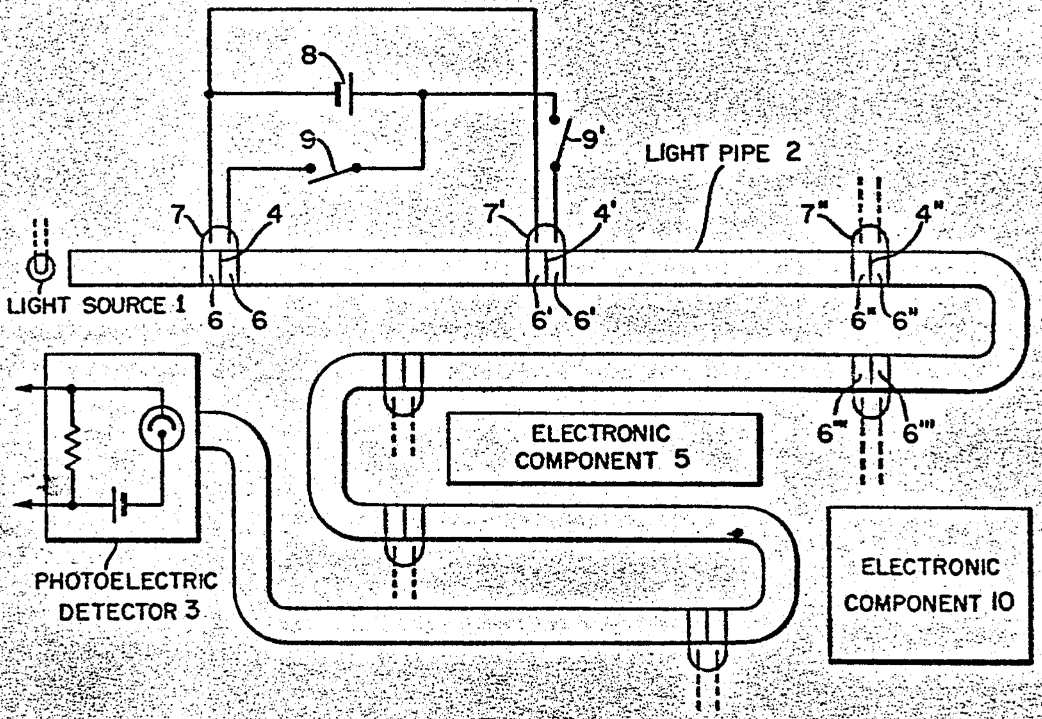
INVENTOR.
OMER F. HAMANN
BY Robert L. Nathans
ATTORNEY United States Patent Office 3,304,433

Patented Feb. 14, 1967

3,304,433

PHOTOSENSITIVE LOGIC CIRCUITRY UTILIZING LIGHT PIPE

Omer F. Hamann, La Jolla, Calif., assignor to General Dynamics Corporation, Rochester, N.Y., a corporation of Delaware Filed Aug. 26, 1964, Ser. No. 392,260
10 Claims. (Cl. 250—227)

The present invention relates to circuitry for carrying out logic operations.

For certain applications in the electronics field, it is desirable to utilize AND gates and OR gates that have as many as 100 or more input terminals. One advantage of these gates is to save diodes and alleviate impedance drops through cascaded gates having lesser numbers of input terminals and arranged in pyramid fashion. However, diode gates having large numbers of input terminals present problems owing to sneak currents resulting from the shunting effect of a large number of back biased diodes connected in parallel. In addition, isolation between input and output circuits connected to these gates is not complete.

Accordingly, it is an object of the present invention to provide novel logic circuitry which has a very large number of input terminals and which eliminates the problem of sneak currents associated with conventional diode logic circuitry.

It is a further object of the present invention to provide novel logic circuitry which provides complete isolation between input and output circuits coupled thereto.

It is a further object of the present invention to provide novel logic circuitry which may be embodied in virtually any desired shape so as to make maximum use of oddly shaped nooks and crannies within a compact module.

It is a further object of the present invention to provide novel logic circuitry having a very large number of input terminals and which is relatively inexpensive to fabricate.

It is yet a further object of the present invention to provide a unique digital-to-analog converter.

Other objects and advantages of the present invention will become apparent from the following detailed description when considered in conjunction with the sole figure.

In accordance with the present invention, a light pipe is provided having a light source of a first frequency or frequency band positioned at one end of the pipe and a light detector positioned at the other end of the pipe. A plurality of generators of electromagnetic radiation having a higher frequency than said first frequency, such as ultraviolet light, are positioned along the length of the pipe adjacent to pipe sections which include a photochromic material which inhibits the passage of the light generated by the light source upon the emission of the ultraviolet light. Since the ultraviolet generators may be selectively energized and since they may be normally on or normally off, the circuitry may be utilized either as an AND gate or an OR gate. Partial doping of photochromic material results in the carrying out of more complex logic. By partially attenuating light traveling throughout the pipe, digital-to-analog conversion may be accomplished. Also, gates may be constructed for producing a binary "one" in the output circuit only upon the application of a fixed number of binary "ones" in the input circuit, such as two, three, or more.

In the preferred embodiment of the present invention disclosed in the figure, a light source 1 is shown positioned adjacent to one end of light pipe 2. Photoelectric detector 3 is positioned at the other end of light pipe 2. Light pipe 2 could consist of any of the widely available plastic or glass light pipes, or could consist of an optical fiber. A photochromic material, as is well known in the art, is a material that changes color or darkens as a result of the absorption of short wavelength electromagnetic energy, such as ultraviolet light or X-rays. The alkali halides and silver halides exhibit this property. See page 158 of "International Dictionary of Physics and Electronics," Van Nostrand, 1956. In accordance with my invention, light pipe 2 may be broken along lines 4. The photochromic material would be diffused into areas 6. After the completion of this diffusion, the pipe sections would again be joined at lines 4 by fusion. Tiny glass or plastic chambers 7 are positioned adjacent pipe sections 6, as shown, and contain a gas or vapor which emits a higher frequency electromagnetic radiation (such as ultraviolet light) than the frequency of the electromagnetic radiation emitted by light source 1. The electrodes positioned within chambers 7 are coupled to a voltage source 8 through switches 9. Each chamber 7 is, of course, connected to voltage source 8 through an individual switch, only two of which are disclosed in the figure. When switch 9 is closed, ionization of a gas, such as mercury vapor, contained within chamber 7 causes pipe section 6 to be exposed to this radiation. Thus, the gas chambers are bistable illuminating elements, since they are "on" when pulsed by an electric signal or "off" when not pulsed. A color center is accordingly induced therein, which color center sharply attenuates the light introduced into the light pipe 2 by light source 1. This attenuation is detected by photoelectric detector 3.

Let it be assumed that the disclosed circuitry is to be utilized as an OR gate. Each switch 9 is open so that its associated gas chamber does not emit ultraviolet light. Accordingly, only binary "zeros" are applied to the input terminals of the OR gate. As a result, no color centers are induced within light pipe 2 and almost all of the light introduced into light pipe 2 by light source 1 emerges from the pipe and is detected by photoelectric detector 3. Now let it be assumed that any one of the switches 9 are closed thereby to manifest a binary "one." The potential of voltage source 8 is impressed across the electrodes contained within a particular gas chamber 7 to cause ionization of the gas contained therein which, in turn, causes a darkening of the section 6 adjacent to the chamber. This darkening sharply attenuates the light traveling through light pipe 2, which attenuation is detected by photoelectric detector 3, to signify a binary "one." Where the disclosed circuitry is utilized as an OR gate, halide doping is such that only one color center is necessary to block out the light to produce a binary "one" in the output circuit of photoelectric detector 3. Obviously the application of a voltage potential to more than one gas chamber will not affect the situation, in the manner of a conventional OR gate. It should be noted that electrical isolation between the input circuits containing switches 9 and the output circuit of photoelectric detector 3 is complete, unlike prior art diode gates.

Now let it be assumed that it is desired to operate the disclosed circuitry as an AND gate. All of the switches 9 associated with all of the gas chambers 7 are closed, thereby to manifest binary "zeros" in the input circuits of the AND gate in contrast to the OR gate operation. Under these circumstances, the light introduced into light pipe 2 by light source 1 cannot reach photoelectric detector 3 so that a binary "zero" is manifested in the output circuit of photoelectric detector 3. It should be apparent that this condition will continue as long as one or more of the switches 9 are closed. However, should each and every switch 9 become open to manifest binary "ones," the light from light source 1 will be able to affect photoelectric detector 3 to cause a binary "one" to be manifested in the output circuit of the detector.

It should be noted that the light pipe may be shaped so as to take advantage of every nook and cranny available between electronic components 5 and 10. If desired, gas chamber 7 could be inserted directly within light pipe 2, but this would result in increased light attenuation at the boundaries of the gas and plastic or glass media owing to reflection. Further, light losses could be induced if the end faces of the light pipes adjacent to the gas chambers were not perfectly parallel with one another. Instead of merely doping portions of light pipe 2 with photochromic material, it is quite possible that the light pipe 2 may be permeated throughout with the photochromic material during the initial light pipe manufacturing process. In this specification the word "light" is to be construed broadly and could include electromagnetic radiation having a frequency anywhere between $10^{12}$ cycles per second up to $10^{21}$ cycles per second. All that is necessary is that a photochromic material is provided within the light pipe which attenuates lower frequency electromagnetic radiation upon being exposed to higher frequency electromagnetic radiation.

In addition to the logic functions set forth hereinabove, the disclosed circuitry may be utilized as a digital-to-analog converter. For this application, the attenuation of light associated with any particular light pipe section 6 would never completely block the light passing through light pipe 2. Instead, the degree of doping of sections 6 with photochromic material would be proportional to a weighted binary code to be converted to an analog signal. For instance, light pipe sections 6 would attenuate the light by eight units, light pipe sections 6' would attenuate the light four units, whereas light pipe sections 6" would attenuate the light two units, et cetera. Let it be assumed that a conventional binary code representing the number 12 is to be converted into its analog equivalent. Color centers would be induced in sections 6 and 6' but not in sections 6" or 6'". Accordingly, the light from light source 1 would be attenuated by 12 units so that the complement of 12 would be manifested in the output circuit of photoelectric detector 3.

Many other logic operations could be readily performed. Partial doping could result in the complete attenuation of light throughout the pipe only where two, three, or more gas chambers are ionized. In other words, the circuitry could produce a binary "one" only where a minimum of two, three, or any other fixed number of binary "ones" are applied to the inputs.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. Logic circuitry comprising, a light pipe containing photochromic substances at a plurality of locations along said pipe, said pipe having a first and second end, a light source positioned adjacent to one end of said light pipe for inserting light into said pipe, means positioned adjacent to the other end of said pipe for detecting the strength of the light generated by said light source and emerging from said pipe, means for causing said photochromic substances to at least partially absorb said light generated by said light source thereby to change the intensity of the light detected by said photoelectric detector.

2. Logic circuitry comprising, a light pipe containing photochromic substances at a plurality of locations along said pipe, said pipe having a first and second end, a light source positioned adjacent to one end of said light pipe for inserting light into said pipe, means positioned adjacent to the other end of said pipe for detecting the emergence of the light generated by said light source from said pipe, means for causing said photochromic substances to at least partially absorb said light generated by said light source thereby to change the intensity of the light detected by said photoelectric detector.

3. Logic circuitry comprising, a light pipe containing photochromic substances at a plurality of locations along said pipe, said pipe having a first and second end, a light source positioned adjacent to one end of said light pipe for inserting light into said pipe, means positioned adjacent to the other end of said pipe for detecting the strength of the light generated by said light source and emerging from said pipe, means for exposing at least one section of said pipe containing said photochromic substances to electromagnetic radiation having a frequency higher than the frequency of said light generated by said light source and for causing said photochromic substances to at least partially absorb said light generated by said light source thereby to change the intensity of the light detected by said photoelectric detector.

4. Logic circuitry comprising, a light pipe containing photochromic substances at a plurality of locations along said pipe, said pipe having a first and second end, a light source positioned adjacent to one end of said light pipe for inserting light into said pipe, means positioned adjacent to the other end of said pipe for detecting the emergence of the light generated by said light source from said pipe, means for exposing at least one section of said pipe containing said photochromic substances to electromagnetic radiation having a frequency higher than the frequency of said light generated by said light source and for causing said photochromic substances to at least partially absorb said light generated by said light source thereby to change the intensity of the light detected by said photoelectric detector.

5. The invention as set forth in claim 3 wherein said means for exposing includes one or more chambers adjacent said light pipe containing a gas which emits said electromagnetic radiation having a frequency higher than the frequency of said light generated by said light source upon being ionized and means for selectively ionizing said chambers.

6. The invention as set forth in claim 4 wherein said means for exposing includes one or more chambers adjacent said light pipe containing a gas which emits said electromagnetic radiation having a frequency higher than the frequency of said light generated by said light source upon being ionized and means for selectively ionizing said chambers.

7. Logic circuitry comprising
(a) a light pipe,
(b) means for deriving a bi-valued output in response to relative presence and relative absence of radiant energy transmitted along said pipe,
(c) a plurality of signal input means optically coupled to said pipe at different positions therealong, said input means each comprising
  (i) a photochromic interface along said pipe,
  (ii) signal responsive bi-stable illuminating elements optically coupled to said interface, and
(d) means for applying binary input signals to said elements for conditioning them selectively into different one of their illuminating states.

8. The invention as set forth in claim 7 wherein said deriving means includes a photoresponsive element which can also produce an analog output signal, wherein each of said interfaces corresponds to a different digit of a digital code, and wherein each of said interfaces has the characteristic of presenting a value of optical attenuation to radiant energy proportional to the value of its corresponding digit.

9. The invention as set forth in claim 7 wherein said deriving means includes a source of said radiant energy at one end of said light pipe and a photoelectric detector at the opposite end thereof, and wherein said signal responsive bi-stable illuminating elements include gas discharge lamps.

10. The invention as set forth in claim 9 wherein said input signal applying means includes electrodes in said lamps and means for applying operating voltages to said electrodes for normally biasing said lamps in selected ones of said bi-stable states.

References Cited by the Examiner

UNITED STATES PATENTS

| | | | | |
|---|---|---|---|---|
| 3,085,469 | 4/1963 | Carlson | 250—229 | X |
| 3,134,019 | 5/1964 | Bishay | 88—106 | X |
| 3,169,190 | 2/1965 | Ress | 250—227 | X |
| 3,188,478 | 6/1965 | Binks | 250—227 | X |

RALPH G. NILSON, *Primary Examiner.*

WALTER STOLWEIN, *Examiner.*